United States Patent [19]

Stroud

[11] Patent Number: 5,901,629
[45] Date of Patent: May 11, 1999

[54] SAW ARBOR AND GUIDED CIRCULAR SAW

[75] Inventor: Gary Arthur Stroud, Vernon, Canada

[73] Assignee: Precision Arbour Systems, Inc., Vernon, Canada

[21] Appl. No.: 08/682,841

[22] Filed: Jul. 12, 1996

[51] Int. Cl.[6] .............................. B23D 61/02; B27B 5/32
[52] U.S. Cl. .............................. 83/665; 83/676; 83/821; 30/388; 144/218
[58] Field of Search ................. 83/425.3, 425.4, 83/665, 666, 676, 698.41, 821, 835, 504; 30/388; 451/342; 403/383; 144/218, 237; 125/15

[56] References Cited

U.S. PATENT DOCUMENTS

| | | | |
|---|---|---|---|
| 1,717,663 | 6/1929 | Checkley | 416/200 R |
| 2,600,459 | 6/1952 | Adams | 451/342 X |
| 2,634,991 | 4/1953 | Stevens | 403/383 |
| 2,972,266 | 2/1961 | McEwan | 76/79 |
| 3,516,460 | 6/1970 | Thrasher | 83/13 |
| 3,604,819 | 9/1971 | Krahe et al. | 416/204 R |
| 3,734,548 | 5/1973 | Kieves | 403/353 |
| 3,892,107 | 7/1975 | Handen et al. | 403/383 X |
| 4,288,998 | 9/1981 | Schnur et al. | 464/106 |
| 4,294,562 | 10/1981 | Mullenberg | 403/383 |
| 4,577,440 | 3/1986 | Junker | 451/342 |
| 4,730,596 | 3/1988 | Maack et al. | 451/342 X |
| 4,730,952 | 3/1988 | Wiley | 83/665 X |
| 4,747,607 | 5/1988 | Emter | 279/133 |
| 4,767,277 | 8/1988 | Buse | 416/241 A |
| 4,989,374 | 2/1991 | Rudolf et al. | 83/666 X |
| 5,058,909 | 10/1991 | Rudolf et al. | 83/666 X |
| 5,157,873 | 10/1992 | Rudolf et al. | 83/666 X |
| 5,263,283 | 11/1993 | Rudolf et al. | 451/342 X |
| 5,303,688 | 4/1994 | Chiuminatta et al. | 83/676 X |
| 5,319,886 | 6/1994 | Steere, Jr. | 83/666 X |
| 5,373,834 | 12/1994 | Chiuminatta et al. | 83/676 X |
| 5,407,296 | 4/1995 | Brown | 403/383 |
| 5,447,086 | 9/1995 | Wittmaier et al. | 83/666 |
| 5,477,845 | 12/1995 | Zuzelo | 83/666 X |

FOREIGN PATENT DOCUMENTS

| | | |
|---|---|---|
| 3804400 A | 8/1989 | Germany . |
| 9102474 U | 8/1991 | Germany . |
| WO 96/31310 | 10/1996 | WIPO . |

*Primary Examiner*—Clark F. Dexter
*Attorney, Agent, or Firm*—Oyen Wiggs Green & Mutala

[57] ABSTRACT

An arbor for a guided circular saw has three symmetrical lobes. The lobes have end regions with profiles which follow an arc centered on an axis of rotation of the arbor. The lobes have driving regions with profiles which follow the arc of a circle centered in an opposing lobe. A saw for use with the arbor has an eye with a shape which closely follows the contour of the arbor. The saw is capable of floating axially along the arbor. The saw and arbor can be used to advantage in sawing machines such as edgers. The arbor provides a much larger contact area than do prior art arbors.

6 Claims, 4 Drawing Sheets

SAW ARBOR AND GUIDED CIRCULAR SAW

FIELD OF THE INVENTION

This invention relates to an arbor for mounting and driving a guided circular saw, to a circular saw adapted for use with the arbor of the invention and to a sawing machine comprising the combination of the arbour and circular saw of the invention. The invention has particular application in thin kerf sawing. The invention has application, for example, in edging machines.

BACKGROUND OF THE INVENTION

U.S. Pat. No. 3,516,460, Thrasher discloses a system for mounting circular saws on an arbor while allowing the saw to float axially on the arbor. The saw is guided between a pair of guides. The Thrasher saw has a scalloped opening that fits around an arbor having a large number of small rounded splines. The Thrasher system permits reasonably accurate thin cuts with the use of thin circular saws guided by saw guides. The use of guided saws which can "float" (i.e. which can move at least slightly longitudinally) on an arbor, while the arbor is turning, has become widely accepted in the saw milling industry.

Typical arbors for mounting and driving guided saws have 18 to 22 rounded splines and are 5 inches to 8 inches in diameter. There are standard sizes and configurations for such arbors. One problem that is now being experienced in the saw milling industry is that "standard" sized splined arbors from different manufacturers are often different sizes. This is partly due to the fact that conventional prior art arbors are very difficult to accurately machine with standard machining techniques. There are several manufacturers of saw arbors. To enable their blades to fit the arbors of all arbor manufacturers, saw blade manufacturers typically make the eyes in their circular saws oversized by as much as about 0.030 inches. The poor fit of a saw on an arbor can cause the saw to "pound" as the arbor turns. This happens despite the fact that most arbors used today have rounded splines, which, in theory, makes them self-centering to some degree. The pounding can spread the eye of the saw which makes the pounding even worse.

Another problem with prior art saws is that, unless the splines and saw are both perfectly machined, which is impossible, not all of the splines engage the eye of the saw when the saw is being driven.

Another problem experienced in saw mills is that the forces exerted on a saw by the lobes in a prior art arbor result in repeated shocks being delivered to the saw blade in a region concentrated around the eye of the saw. These problems are exacerbated because conventional arbors provide only a very small driving contact area between the arbor and a saw blade.

Some have attempted to reduce these problems by providing a more accurately machined saw and arbor which fit together to very close tolerances. This approach has not been entirely satisfactory because, with arbors of conventional design, close tolerances between saw and arbor tend to increase the likelihood that the saw will "bind" on the arbor and will not float freely along the arbor as is desired. Furthermore, it is not possible with common current techniques to cut the eye of a saw to an accuracy of better than about ±0.002 inches. Further, such arbors still provide only a very small contact area.

SUMMARY OF THE INVENTION

One aspect of the invention provides an arbor for mounting and driving a guided circular saw. The arbor comprises a shaft having an axis of rotation. A saw mounting portion of the shaft has a trilaterally symmetrical cross sectional profile defining three rounded lobes. In a preferred embodiment, each of the lobes has a leading edge portion in which the cross sectional profile follows an arc of a circle centered in an opposing one of said lobes. In a further preferred embodiment of the invention, each of the lobes has an end region and, in the end region, the cross sectional profile follows an arc of a circle centered on the axis of rotation of the arbor.

A second aspect of the invention provides a sawing machine comprising: a frame; an arbor pivotally mounted to the frame for rotation about a longitudinal axis of the arbor, the arbor comprising a saw mounting portion having a cross sectional profile, one or more portions of said profile following an arc of a circle centered on the axis, the remainder of said cross sectional profile lying entirely within the circle; a circular saw mounted on the saw mounting portion for rotation with said arbor, the circular saw comprising an eye having a profile corresponding to the cross sectional profile of the arbor, the arbor leaving the saw free to float axially along the saw mounting portion; and, a guide on either side of the saw near a peripheral edge of the saw. The saw mounting portion of said shaft preferably has a trilaterally symmetrical cross sectional profile defining three lobes.

A third aspect of the invention provides a saw and arbor combination comprising: an arbor comprising a shaft having an axis of rotation and a saw mounting portion, the saw mounting portion having a cross sectional profile trilaterally symmetrical about said axis and including one or more first contact portions and one or more first driving portions wherein, in said first contact portions, said cross sectional profile follows an arc of a circle centered on the axis of rotation of the arbor and, in said first driving portions, said cross sectional profile has a radial component; and, a circular saw comprising a blade perforated by an eye mounted on said arbor with said saw mounting portion of said arbor projecting through said eye, an inner peripheral edge of said blade surrounding said eye conforming closely to said cross sectional profile of said arbor. The saw is capable of axial floating movement on the shaft.

A fourth aspect of the invention provides a circular saw comprising a generally planar circular blade having a plurality of cutting teeth arranged around its outer periphery. The blade is perforated by an eye centered on an axis of rotation of the blade. The eye has a shape defined by an inner edge of the blade. The shape is trilaterally symmetrical and has three equally spaced rounded lobes.

BRIEF DESCRIPTION OF THE DRAWINGS

In drawings which illustrate non-limiting preferred embodiments of the invention.

DETAILED DESCRIPTION OF PREFERRED EMBODIMENTS OF THE INVENTION

Figure 1A:
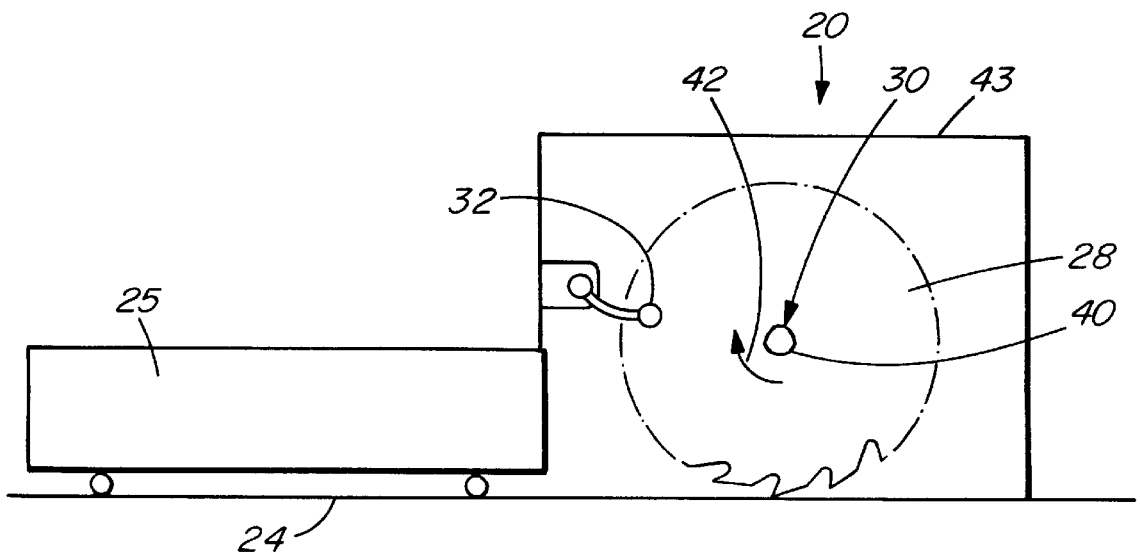
FIG. 1A is a partially schematic side elevational view of an edger equipped with a circular saw and an arbor according to the invention.
Figure 1B:
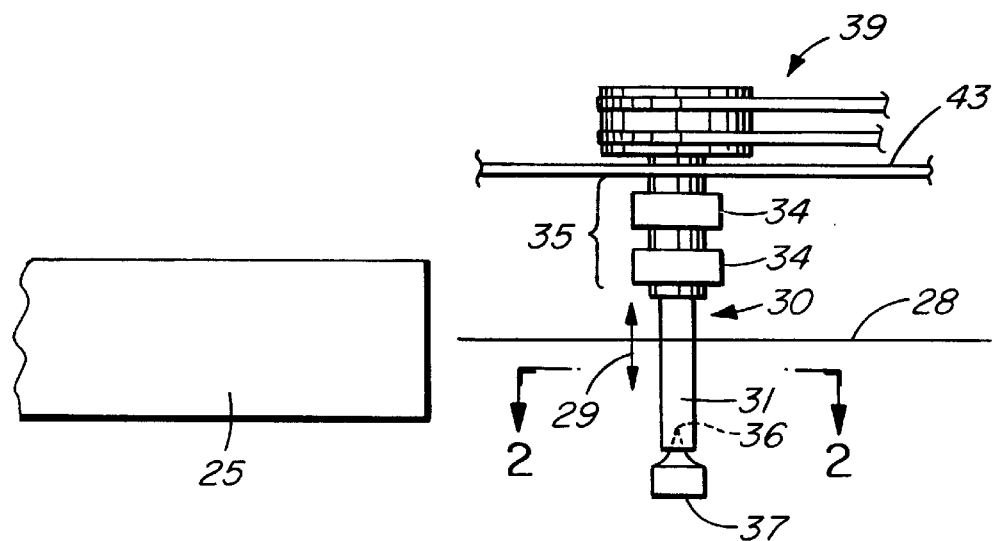
FIG. 1B is a partially schematic cut away top plan view of the edger shown in FIG. 1A.
Figure 4:
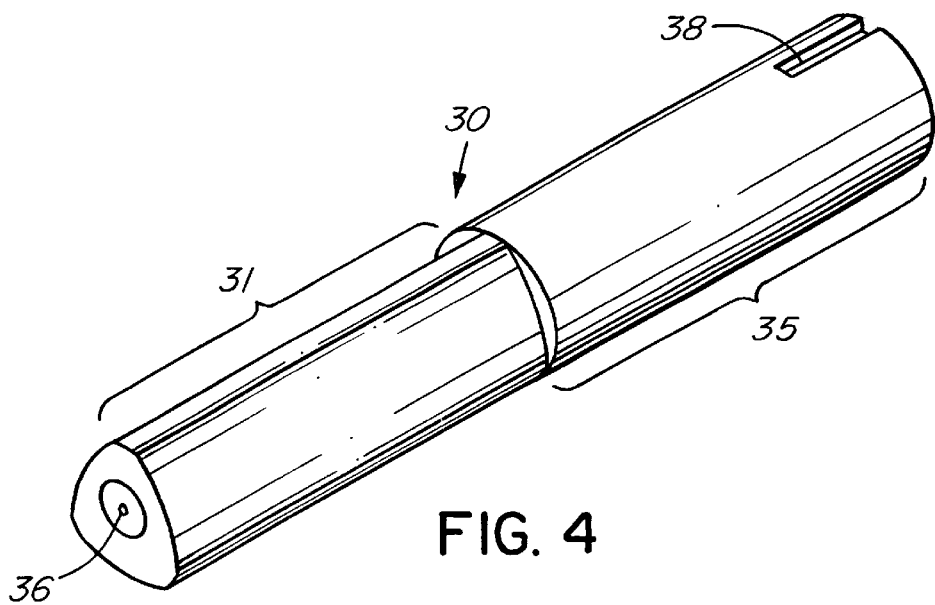
FIG. 4 is a perspective view of the arbor from the edger of FIGS. 1A and 1B.

FIGS. 1A and 1B show an edger 20 which includes a carriage 24 for moving a cant 25 past a circular saw 28 mounted on a saw mounting portion 31 of an arbor 30. Saw 28 is guided between a pair of guides 32. Arbor 30 is mounted in suitable bearings 34 so that it can rotate freely about its axis 40 as indicated by arrow 42. Bearings 34 and guides 32 are supported on a suitable frame 43 which is shown schematically in FIGS. 1A and 1B. As shown in FIG. 4, Arbor 30 has a mounting area 35 which is supported by bearings 34 and an indentation 36 at its opposite end for receiving a support bearing 37 which supports the opposite end of arbor 30 during use.

The rotation of arbor 30 about axis 40 is driven by a suitable drive unit (not shown) such as an electric motor, suitably coupled to arbor 30 by, for example, a belt drive 39. Saw 28 is free to float slightly axially on saw mounting portion 31 of arbor 30 as indicated by arrow 29 (FIG. 1B) while remaining between guides 32. In most typical edging applications, saw 28 is in the range of 17 inches to 26 inches in diameter and rotates with a surface speed of about 10,500 to about 13,000 feet per minute.

Figure 2:
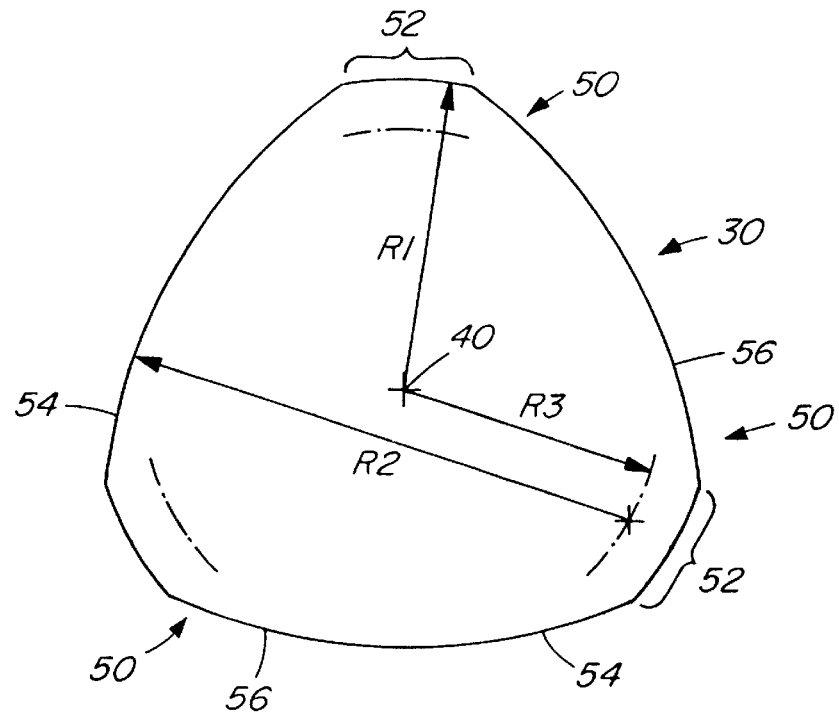
FIG. 2 is a section on the lines 2—2 through the arbor shown in FIG. 1B.

FIGS. 1A, 1B and 2 show a single saw 28 on a single arbor 30 for clarity. Modem edgers typically have several saws 28 at spaced apart positions along an arbor 30. Edgers often have two or more arbors. The invention may be applied to edgers having multiple saws and/or multiple arbors. The diameter of saw 28 is not critical. The invention has application in almost all situations where a guided circular saw floats on and is driven by an arbor. Some sawing machines include means for moving the saw guides to shift one or more saws along an arbor as the arbor is rotating. The inventor considers that the saw and arbor of the invention are particularly well adapted for use in such shifting-saw edgers.

As shown best in FIG. 4, arbor 30 differs from the prior art arbors described above in that it has a saw mounting portion 31 having a trilaterally symmetrical cross sectional profile. The saw mounting portion 31 of arbor 30 has three lobes 50. Each lobe 50 has an end region 52. Preferably, the periphery of arbor 30 in end regions 52 which may be called a "contact portion" is defined by an arc of radius $R_1$ centered on the axis 40 of arbor 30. Each end region 52 preferably extends through an angle of about 20 degrees. This profile of arbor 30 makes it easy to accurately machine end regions 52 and provides a smooth shape that is unlikely to bind in the eye 60 of a circular saw 28. It is readily possible to machine the end regions 52 of lobes 50 to very close tolerances using conventional techniques because the end regions 52 all lie on a cylindrical surface centered on axis 40.

Each lobe 50 has leading and trailing side regions 54, 56. The leading side regions 54 may be called "driving portions". Preferably, the edges of arbor 30 in side regions 54, 56 are defined by arcs of radius $R_2$ about a point central to an opposing lobe 50 and separated from axis 40 by a distance $R_3$. In an arbor for mounting a 24 inch diameter edging saw, $R_1$ is typically about 3 inches, $R_2$ is typically about 2½ inches, and $R_3$ is typically about 5 inches. This provides arbor 30 with a smooth profile that is resistant to binding in eye 60 and yet provides a positive driving action.

Figure 5:
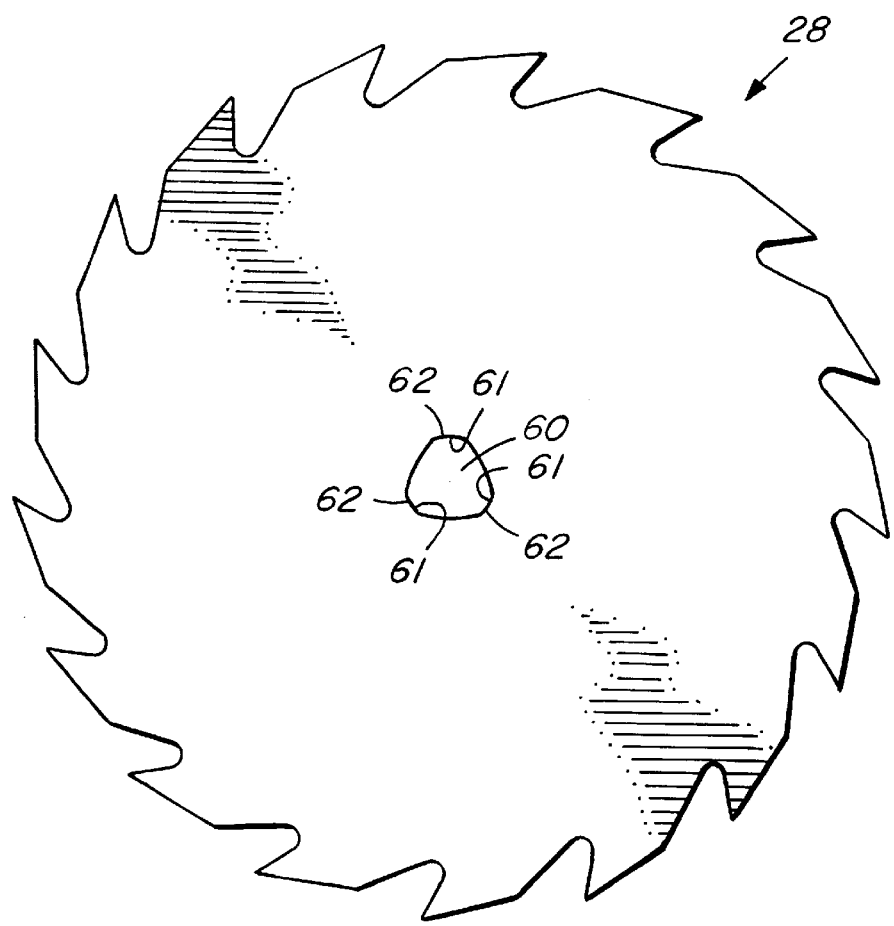
FIG. 5 is a side elevational view of a saw for use with the arbor of FIG. 4; and, FIG. 6 is a fragmentary schematic view showing the distribution of stress in a saw according to the invention.

Saw 28 has an eye 60 (FIG. 5). Eye 60 has an internal profile that conforms with the cross sectional profile of arbor 30. Eye 60 has indentations 61 to receive lobes 50. Each indentation 61 has an end region 62 which receives the end region 52 of one of lobes 50. Eye 60 is very slightly larger than arbor 30 to allow saw 28 to be mounted on and to float on arbor 30. The clearance between arbor 30 and the inside surfaces of eye 60 should preferably be about 0.002 to 0.004 inches in end regions 52 and in leading and trailing side regions 54, 56. Lobes 50 are preferably smoothly rounded, as shown, with no sharp acute corners that could cause a saw 28 to bind as it floats along arbor 30.

The close fit between end regions 62 of indentations 61 and end regions 52 of lobes 50 permits a reasonably tight fit of saw 28 to arbor 30. This in turn, reduces vibration of saw 28 during cutting. Saw 28 can still slide along arbor 30 because the smooth profile of lobes 50 reduces the likelihood that lobes 50 will bind in eye 60.

Figure 3:
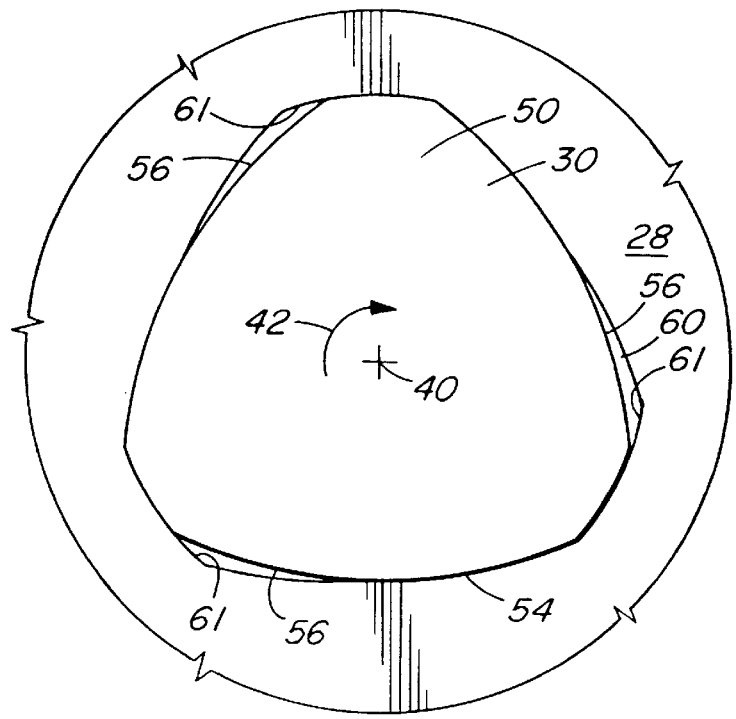
FIG. 3 is a transverse section through the arbor of FIG. 2 near the point where it passes through the eye of a saw.

FIG. 3 shows an exaggerated view of an arbor 30 driving a saw 28. The leading edges 54 of lobes 50 are twisted toward, and are in firm contact with, corresponding areas in indentations 61. The trailing edges 56 of lobes 50 are pulled away from corresponding areas in indentations 61. Because there are only three lobes 50 all the leading edges 54 of each of lobes 50 are in contact with eye 60. It is not possible for arbor 30 to be in stable engagement with eye 60 if only one or two leading edges 54 are in contact with eye 60.

The design of arbor 30 provides a large area of driving contact between saw 28 and arbor 30. The total driving contact area is three times the length of leading region 54 of lobes 50 (because there are 3 lobes 50) multiplied by the thickness of saw 28. This contact area is much greater than the contact area provided by the prior art designs noted above. The greater contact area couples saw 28 to arbor 30 more tightly than is possible with most available prior art designs and spreads out loads over larger distances on the edge of eye 60. The inventor believes that this, in turn, makes saw 28 more resistant to "pounding" and reduces the vibration of saw 28.

Figure 6:
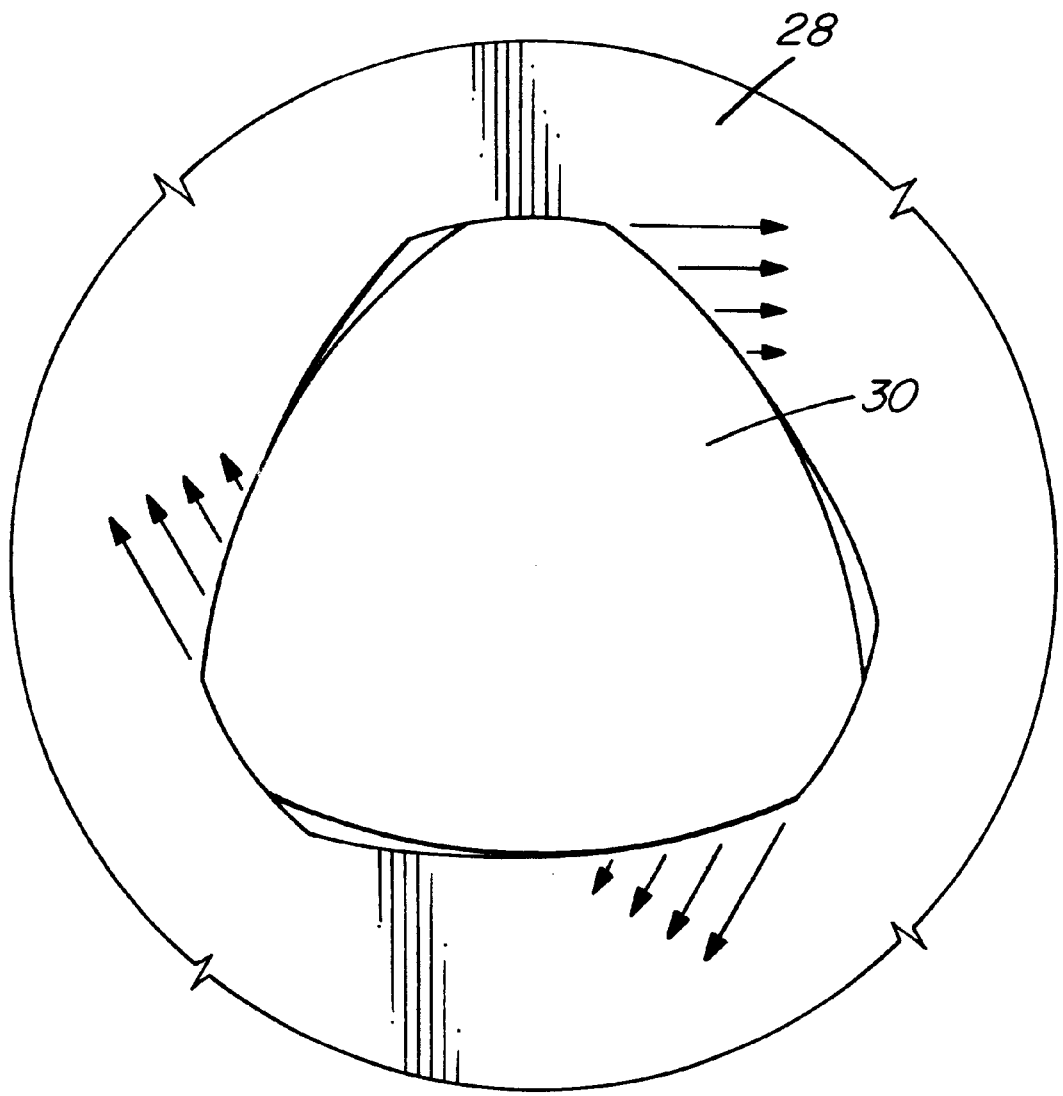

As illustrated schematically in FIG. 6, when arbor 30 is in use, the stresses in saw 28 which result from the pressure exerted by leading regions 54 on eye 60 are concentrated in the body of saw 28. In contrast, the stresses in a prior art saw mounted on a prior art arbor are concentrated in and around the eye of the prior art saw.

As will be apparent to those skilled in the art in the light of the foregoing disclosure, many alterations and modifications are possible in the practice of this invention without departing from the spirit or scope thereof. For example, while arbor 30 should have a trilaterally-symmetrical cross sectional profile which provides three rounded lobes, the shape of the lobes may be varied without departing from the broad scope of the invention. For example, the profile of lobes 50 in end regions 52 and/or leading and trailing side regions 54, 56 may follow straight lines or gently concave curves (which meet at suitably rounded corners) instead of the convex curves described above. Accordingly, the scope of the invention is to be construed in accordance with the substance defined by the following claims.

I claim:

1. A sawing machine comprising:
   (a) a frame;
   (b) an arbor rotatable mounted to said frame for rotation about a longitudinal axis of said arbor, said arbor comprising a saw mounting portion having a cross sectional profile;
   (c) a circular saw mounted on said saw mounting portion for rotation with said arbor, said circular saw comprising an eye having a profile which conforms substantially to said cross sectional profile of said arbor, said eye being of a size larger than said saw mounting portion to allow said saw to float axially along said saw mounting portion; and, (d) first and second guides coupled to said frame, said first and second guides located respectively on first and second sides of said saw near a peripheral edge of said saw;

wherein said cross sectional profile is trilaterally symmetrical and defines three lobes, each of said lobes having a leading side portion in which said cross sectional profile follows an arc of a circle centered in an opposing one of said lobes.

2. The sawing machine of claim 1 wherein each of said lobes comprises an end region and, in each said end region, said cross sectional profile follows an arc of a circle centered on the longitudinal axis of rotation of the arbor.

3. A saw and arbor combination comprising:

(a) an arbor, said arbor having a longitudinal axis of rotation and a saw mounting portion, said saw mounting portion having a cross sectional profile which defines three rounded lobes, is trilaterally symmetrical about said axis and includes a contact portion and a driving portion on each of said lobes wherein, in said contact portions, said cross sectional profile follows an arc of a circle centered on said axis of rotation of said arbor and, in said driving portions, said cross sectional profile follows an arc of a circle centered in an opposing one of said lobes; and, (b) a circular saw comprising a blade perforated by an eye and mounted on said arbor with said saw mounting portion of said arbor projecting through said eye, an inner peripheral edge of said blade forming said eye and substantially conforming to said cross sectional profile of said arbor;

wherein said eye is larger than said saw mounting portion to allow axial floating movement of said saw on said saw mounting portion.

4. A circular saw comprising a generally planar circular blade having a plurality of cutting teeth arranged around its outer periphery wherein said blade is perforated by an eye centered on an axis of rotation of said blade, said eye having a shape which is trilaterally symmetrical and has three equally spaced rounded lobes, wherein each of said lobes has a leading side portion in which said shape follows an arc of a circle centered in an opposing one of said lobes.

5. The arbor of claim 4 wherein each of said lobes comprises an end region and, in each said end region, said shape follows an arc of a circle concentric with said blade.

6. A saw and arbor combination comprising:

(a) an arbor having an axis of rotation and a saw mounting portion, said saw mounting portion having a trilaterally symmetrical cross sectional profile defining three rounded lobes, each of said lobes extending around approximately one third of a circumference of said saw mounting portion, a leading side portion of each of said lobes following an arc of a circle centered in an opposing one of said lobes; and, (b) a circular saw comprising a blade perforated by an eye and mounted on said arbor with said saw mounting portion of said arbor projecting through said eye, said eye substantially conforming to said cross sectional profile of said arbor;

wherein said eye is larger than said saw mounting portion to permit axial floating movement of said saw along said saw mounting portion.

* * * * *